(12) United States Patent
Allen

(10) Patent No.: US 9,104,369 B1
(45) Date of Patent: Aug. 11, 2015

(54) PORTABLE BATHROOM CABINET SYSTEM

(76) Inventor: Cassandra E. Allen, Rock Hill, SC (US)

(*) Notice: Subject to any disclaimer, the term of this patent is extended or adjusted under 35 U.S.C. 154(b) by 666 days.

(21) Appl. No.: 13/427,038

(22) Filed: Mar. 22, 2012

(51) Int. Cl.
*B65D 69/00* (2006.01)
*G06F 1/16* (2006.01)
*A47K 11/10* (2006.01)

(52) U.S. Cl.
CPC .............. *G06F 1/1628* (2013.01); *A47K 11/10* (2013.01)

(58) Field of Classification Search
CPC ........ A45C 13/02; B65D 85/20; B65D 85/68; G06F 1/1628
USPC ......... 206/225, 226, 229, 230, 572, 576, 577, 206/223, 581, 823, 349, 361, 362, 362.3; 312/211, 229, 206, 207; 422/24
See application file for complete search history.

(56) References Cited

U.S. PATENT DOCUMENTS

| | | | |
|---|---|---|---|
| D206,100 S | 10/1966 | O'Neil | |
| 3,429,474 A * | 2/1969 | Cann | 220/555 |
| 4,008,933 A * | 2/1977 | Wanek | 312/206 |
| D287,788 S | 1/1987 | Shames et al. | |
| 4,940,159 A | 7/1990 | Callas et al. | |
| 5,076,458 A | 12/1991 | Weiner et al. | |
| 5,108,000 A | 4/1992 | Stoll et al. | |
| 5,184,744 A | 2/1993 | Paulison | |
| D333,742 S | 3/1993 | Reutenauer, Jr. et al. | |
| 5,595,303 A * | 1/1997 | Weeks et al. | 206/576 |
| 5,839,771 A * | 11/1998 | DeMars | 294/146 |
| 5,873,643 A | 2/1999 | Burgess, Jr. et al. | |
| 5,971,141 A * | 10/1999 | Shafik | 206/225 |
| 5,984,100 A * | 11/1999 | Ramsey et al. | 206/581 |
| 6,367,621 B1 * | 4/2002 | Johnson | 206/15.3 |
| D463,084 S | 9/2002 | Forest | |
| 7,669,715 B2 * | 3/2010 | Wang | 206/581 |
| 7,841,029 B1 * | 11/2010 | Williams | 4/661 |
| 2006/0123531 A1 * | 6/2006 | Karlicek | 4/255.11 |
| 2008/0029415 A1 * | 2/2008 | Wang | 206/361 |
| 2008/0295870 A1 * | 12/2008 | Perelli et al. | 134/42 |

* cited by examiner

*Primary Examiner* — Jacob K Ackun
*Assistant Examiner* — Jenine Pagan

(57) ABSTRACT

The present invention features a novel portable bathroom cabinet system for providing storage close to a toilet for personal hygiene products, accessories, cleaning supplies, and refuse. The cabinet system has a first cavity for storing toilet cleaning and maintenance supplies that has a drip tray, a toilet brush with a folding handle, and a plunger with a folding handle. The cabinet system also has a second cavity for storing rolls of toilet tissue. The cabinet system further has a third cavity with a drawer for storing personal hygiene products and accessories. The third cavity further has one or more plastic shopping bag securing projections sized to engage a handle opening on a top of a standard plastic shopping bag for storing debris in the standard plastic shopping bag.

15 Claims, 3 Drawing Sheets

PORTABLE BATHROOM CABINET SYSTEM

BACKGROUND OF THE INVENTION

The use of cabinets has been known to mankind for a long time. Cabinets have been used in countless applications and constructed from many materials including solid and engineered wood components, plastics and metals. Most often when a cabinet is used, it is in a permanent installation, meaning, if the cabinet is removed, there will be damage to the cabinet or the mounting surface. Portable cabinets address this concern by combining the useful functionality of a typical cabinet system with the advantages of portability. The present invention combines a portable cabinet system with specific components that are commonly used in a bathroom setting.

SUMMARY

The present invention features a novel portable bathroom cabinet system for providing storage close to a toilet for personal hygiene products, accessories, cleaning supplies, and refuse.

In some embodiments, the cabinet system has a first cavity located on a first cabinet end for storing toilet cleaning and maintenance supplies. The first cavity has a drip tray removably located on the first cavity floor, a toilet brush having a folding handle, and a plunger having a folding handle. In some embodiments, the cabinet system has a second cavity located in a middle cabinet section for storing rolls of toilet tissue.

In some embodiments, the cabinet system has a third cavity located on the second cabinet end having a drawer located on a cabinet front face close to the third cavity floor. The drawer is for storing personal hygiene products and accessories. In some embodiments, the cabinet system further has one or more plastic shopping bag securing projections located in the third cavity close to the third cavity top opening. The shopping bag securing projection is sized to engage a handle opening on a top of a standard plastic shopping bag. In some embodiments, the third cavity further has a domed lid removably located above the third cavity top opening, and a removable divider horizontally located parallel to the third cavity floor above the drawer. In some embodiments, the removable divider divides a top chamber of the third cavity from a bottom chamber of the third cavity. The top chamber is for housing the standard plastic shopping bag to be used to collect refuse, and the bottom chamber is for housing the drawer.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
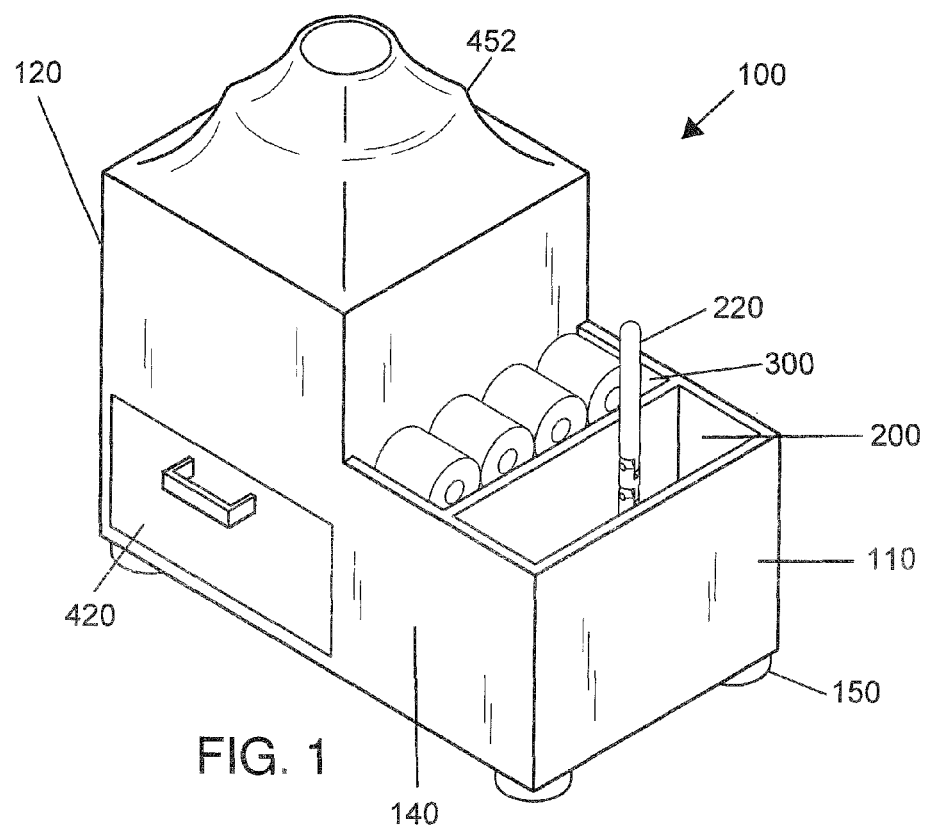
FIG. 1 is a perspective view of the present invention.
Figure 2:
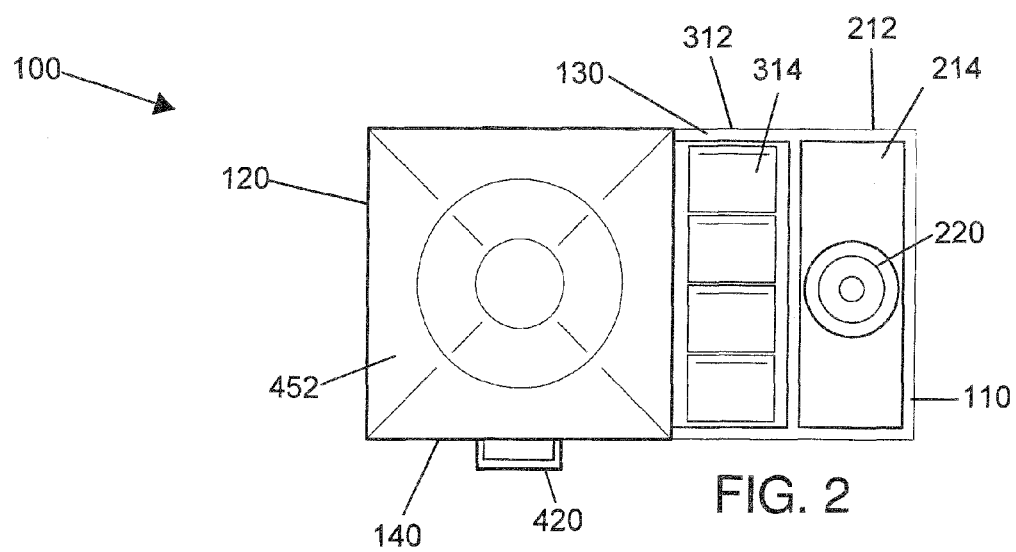
FIG. 2 is a top view of the present invention.
Figure 3:
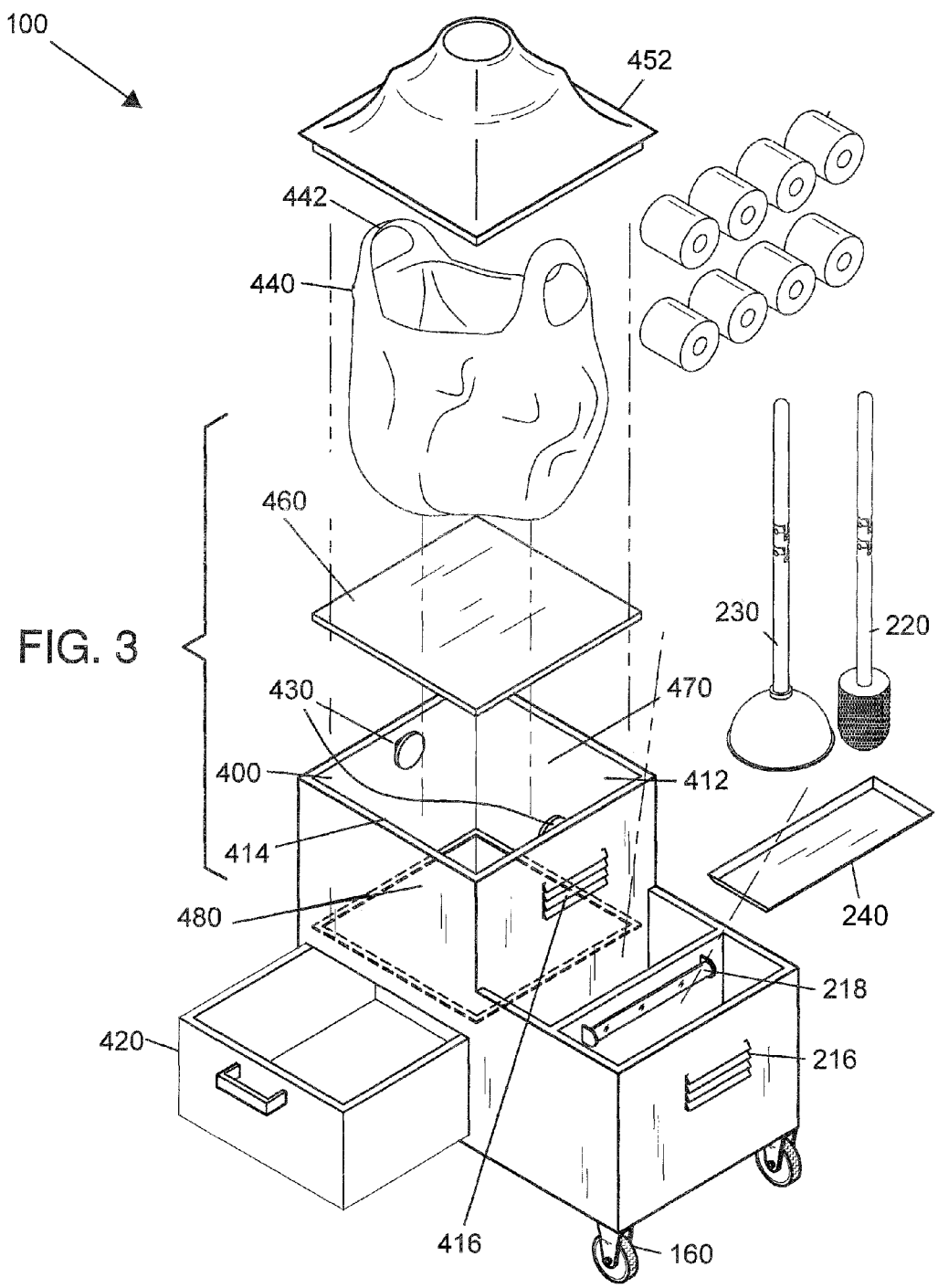
FIG. 3 is a perspective view of the components of the present invention.
Figure 4:
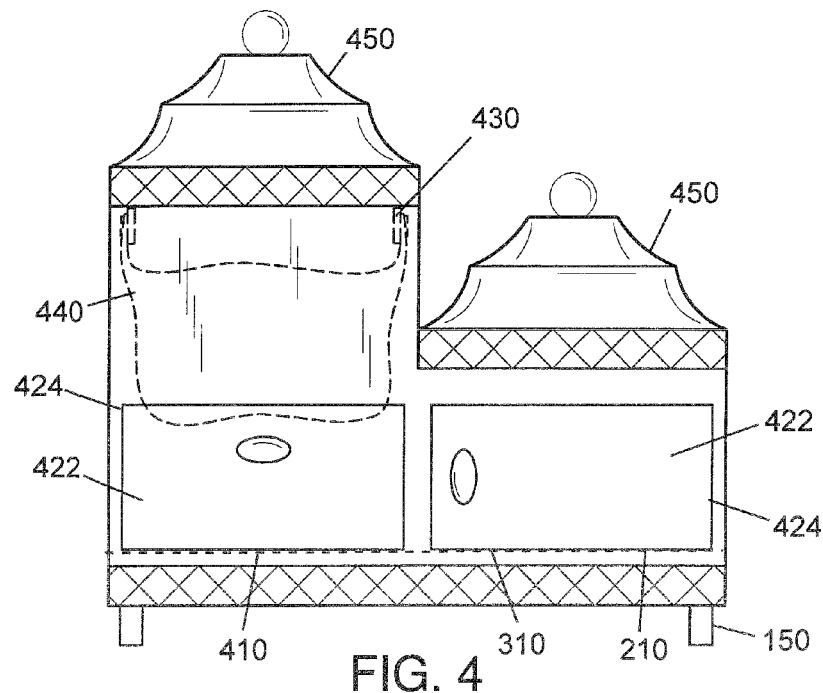
FIG. 4 is a front view of the present invention.
Figure 5:
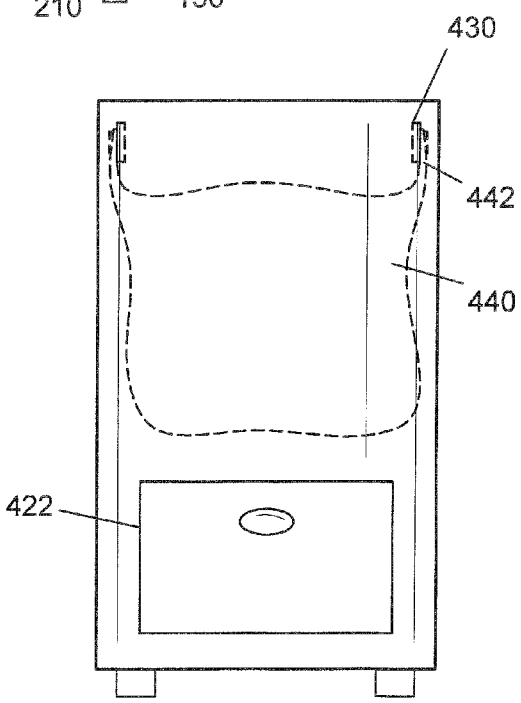
FIG. 5 is a side view of the present invention.

Following is a list of elements corresponding to a particular element referred to herein:
100 System
110 First cabinet end
120 Second cabinet end
130 Middle cabinet section
140 Cabinet front face
150 Leg
160 Wheel
200 First cavity
210 First cavity floor
212 First cavity side
214 First cavity top opening
216 First cavity vent
218 Ultraviolet light assembly
220 Toilet brush
230 Plunger
240 Drip tray
300 Second cavity
310 Second cavity floor
312 Second cavity side
314 Second cavity top opening
400 Third cavity
410 Third cavity floor
412 Third cavity side
414 Third cavity top opening
416 Third cavity vent
420 Drawer
422 Cabinet door
424 Side opening
430 Plastic shopping bag securing projection
440 Standard plastic shopping bag
442 Handle opening
450 Domed lid
452 Lid
460 Removable divider
470 Third cavity top chamber
480 Third cavity bottom chamber Referring now to FIG. 1-5 the present invention features a novel portable bathroom cabinet system (100) for providing storage close to a toilet for personal hygiene products, accessories, cleaning supplies, and refuse.

In some embodiments, the system has a first cabinet end (110), a second cabinet end (120), a middle cabinet section (130), and a cabinet front face (140).

In some embodiments, the system has a first cavity (200) located on a first cabinet end (110) for storing toilet cleaning and maintenance supplies. In some embodiments, the first cavity (200) has a first cavity floor (210), a plurality of first cavity sides (212), and a first cavity top opening (214) that faces upward.

In some embodiments, the first cavity (200) further has a drip tray (240) removably located on the first cavity floor (210) that spans a length and a width of the first cavity floor (210). In, some embodiments, the drip tray (240) has raised edges on all sides.

In some embodiments, a toilet brush (220) with a folding handle is removably located above the drip tray (240) in the first cavity (200). In some embodiments, a plunger (230) having a folding handle is removably located above the drip tray (240) in the first cavity (200).

In some embodiments, the system has a second cavity (300) located in a middle cabinet section (130) for storing rolls of toilet tissue. In some embodiments, the second cavity (300) has a second cavity floor (310), a plurality of second cavity sides (312), and a second cavity top opening (314) that faces upward. In some embodiments, the second cavity (300) is sized to hold four rolls of toilet tissue. In some embodiments, the second cavity (300) is sized to hold eight rolls of toilet tissue. In some embodiments, the second cavity (300) is sized to hold twelve rolls of toilet tissue. In some embodiments, the second cavity (300) is sized to hold twenty-four rolls of toilet tissue.

In some embodiments, the second cavity (300) is about 4½ inches wide or a multiple thereof. In some embodiments, the second cavity (300) is about 4½ inches long or a multiple thereof. In some embodiments, the second cavity (300) is about 4½ inches deep or a multiple thereof.

In some embodiments, the system has a third cavity (400) located on the second cabinet end (120). In some embodiments, the third cavity has a third cavity floor (410), a plurality of third cavity sides (412), and an third cavity top opening (414) that faces upward.

In some embodiments, the third cavity (400) has a sliding drawer (420) located on the cabinet front face (140) close to the third cavity floor (410). In some embodiments, the drawer (420) is for storing personal hygiene products and accessories.

In some embodiments, one or more plastic shopping bag securing projections (430) are located in the third cavity (400) close to the third cavity top opening (414). The shopping bag securing projection (430) is sized to tightly engage a handle opening (442) on a top of a standard plastic shopping bag (440). In some embodiments, the plastic shopping bag securing projection (430) is a generally solid cylindrically shaped projection sized to fit the inner periphery of the handle opening (442). In some embodiments, the plastic shopping bag securing projection (430) is a series of hooks sized to fit the inner periphery of the handle opening (442).

In some embodiments, a domed lid (450) is removably located on the third cavity top opening (414). In some embodiments, the domed lid (450) is pivotally hinged on a side.

In some embodiments, a removable divider (460) is horizontally located in the third cavity (400) parallel to the third cavity floor (410) above the drawer (420). In some embodiments, the removable divider (460) divides a third cavity top chamber (470) from a third cavity bottom chamber (480), where the third cavity top chamber (470) is used for housing the plastic shopping bag (440) to be used to collect refuse, and the third cavity bottom chamber (480) is used for housing the drawer (420).

In some embodiments, the toilet brush (220) and the toilet plunger (230) can be removably housed in the first cavity (200). In some embodiments, the drip tray (240) can be removed from the first cavity (200) for draining or cleaning. In some embodiments, bathroom or drain cleaners can be removably housed in the first cavity (200).

In some embodiments, toilet tissue can be removably housed in the second cavity (300).

In some embodiments, personal hygiene products and accessories can be removably housed in the drawer (420) located in the third cavity (400). In some embodiments, a plastic shopping bag (440) can be affixed to the bag securing projection (430), used to collect refuse, discarded upon filling, and then replaced by a second plastic shopping bag (440).

In some embodiments, the portable bathroom cabinet system (100) has a first cavity (200), a second cavity (300), and a third cavity (400) but does not have a fourth cavity. In some embodiments, the portable bathroom cabinet system can be for used for providing storage close to a toilet for personal hygiene products, accessories, cleaning supplies, and refuse in a bathroom.

In some embodiments, the cabinet system (100) is a single, integrated unit using partitions to define the first cavity (200), the second cavity (300), and the third cavity (400). In some embodiments, the cabinet system (100) is comprised of modular components that attach.

In some embodiments, the cabinet system (100) has a plurality of legs (150) located beneath the cabinet system (100). In some embodiments, the cabinet system (100) has a plurality of wheels (160) located beneath the cabinet system (100). In some embodiments, the wheels (160) are locking.

In some embodiments, the cabinet system (100) is constructed from a wood or an engineered wood product. In some embodiments, the cabinet system (100) is constructed from a plastic. In some embodiments, the cabinet system (100) is constructed from a metal. In some embodiments, the cabinet system (100) is constructed from a combination of wood, an engineered wood product, plastic or metal.

In some embodiments, the first cavity (200) has an ultraviolet light assembly (218), for reducing bacteria, viruses, mold, and dust mites in the first cavity (200) that could be introduced by the toilet brush (220) or the plunger (230). In some embodiments, the third cavity (400) has an ultraviolet light assembly (218), for reducing bacteria, viruses, mold, and dust mites in the first cavity (200) that could be introduced by the debris collected by the standard plastic shopping bag (440).

In some embodiments, the first cavity (200) has a lid (452). In some embodiments, the second cavity (300) has a lid (452). In some embodiments, the lid (452) is pivotally hinged on a side.

In some embodiments, the toilet brush (220) does not have a folding handle. In some embodiments, the plunger (230) does not have a folding handle.

In some embodiments, the first cavity (200) is located in the middle cabinet section (130) and the second cavity (300) is located on the first cabinet end (110). In some embodiments, the third cavity (400) is located in the middle cabinet section (130) and the second cavity (300) is located on the second cabinet end (120). In some embodiments, the third cavity (400) is vertically located directly above both the first cavity (200) and the second cavity (300).

In some embodiments, the cabinet system (100) has a cabinet door (422) pivotally attached to the cabinet front face (140), that covers a side opening (424) on the cabinet front face (140). In some embodiments, the cabinet door (422) is pivotally hinged to the cabinet front face (140). In some embodiments, the side opening (424) fluidly connects to the first cavity (200). In some embodiments, the side opening (424) fluidly connects to the second cavity (300). In some embodiments, the side opening (424) fluidly connects to the third cavity (400).

In some embodiments, the first cavity (200) has a first cavity vent (216) located therein. The first cavity vent (216) aids in moisture and odor control inside the first cavity (200). In some embodiments, the third cavity (400) has a third cavity vent (416) located therein. The third cavity vent (416) aids in moisture and odor control inside the third cavity (400).

As used herein, the term "about" refers to plus or minus 10% of the referenced number. For example, an embodiment wherein the cabinet is about 10 inches in length includes a cabinet that is between 9 and 11 inches in length.

The disclosures of the following U.S. Patents are incorporated in their entirety by reference herein: U.S. Pat. No. 4,008,933; U.S. Pat. No. 4,940,159; U.S. Pat. No. 5,076,458; U.S.

Pat. No. 5,108,000; U.S. Pat. No. 5,184,744; U.S. Pat. No. 5,873,643; U.S. Pat. No. 206,100; U.S. Pat. No. 287,788; U.S. Pat. No. 333,742; U.S. Pat. No. 463,084.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A novel portable bathroom cabinet system (100) for providing storage proximal to a toilet for personal hygiene products, accessories, cleaning supplies, and refuse comprising:
   (a) a first cabinet end (110), a second cabinet end (120), a middle cabinet section (130), and a cabinet front face (140);
   (b) a first cavity (200) disposed on a first cabinet end (110) for storing toilet cleaning and maintenance supplies, said first cavity (200) having a first cavity floor (210), a plurality of first cavity sides (212), and a first cavity top opening (214), said first cavity top opening (214) facing upward, said first cavity (200) further comprising:
      (i) a drip tray (240) removably disposed on the first cavity floor (210), said drip tray (240) spans a length and a width of the first cavity floor (210),
      (ii) a toilet brush (220) having a folding handle, said toilet brush (220) is removably disposed above the drip tray (240) in the first cavity (200), and
      (iii) a plunger (230) having a folding handle, said plunger (230) is removably disposed above the drip tray (240) in the first cavity (200);
   (c) a second cavity (300) disposed in a middle cabinet section (130) for storing rolls of toilet tissue, said second cavity (300) having a second cavity floor (310), a plurality of second cavity sides (312), and a second cavity top opening (314), said second cavity top opening (314) facing upward; and
   (d) a third cavity (400) disposed on the second cabinet end (120), said third cavity having a third cavity floor (410), a plurality of third cavity sides (412), and an third cavity top opening (414), said third cavity top opening (414) facing upward, said third cavity (400) further comprising:
      (i) a drawer (420) slidably disposed on the cabinet front face (140) proximal to the third cavity floor (410), said drawer (420) is for storing personal hygiene products and accessories,
      (ii) one or more plastic shopping bag securing projections (430) disposed in the third cavity (400) proximal to the third cavity top opening (414), said shopping bag securing projection (430) is sized to expandably engage a handle opening (442) on a top of a standard plastic shopping bag (440),
      (iii) a domed lid (450) removably disposed on the third cavity top opening (414), and
      (iv) a removable divider (460), said divider (460) is horizontally disposed in the third cavity (400) parallel to the third cavity floor (410) above the drawer (420) to divide a third cavity top chamber (470) from a third cavity bottom chamber (480), wherein the third cavity top chamber (470) is for housing a plastic shopping bag (440) to be used to collect refuse, wherein the third cavity bottom chamber (480) is for housing the drawer (420);

wherein the toilet brush (220) and the toilet plunger (230) can be removably housed in the first cavity (200), wherein the drip tray (240) can be removed from the first cavity (200) for draining or cleaning, wherein bathroom or drain cleaners can be removably housed in the first cavity (200), wherein toilet tissue can be removably housed in the second cavity (300), wherein personal hygiene products and accessories can be removably housed in the drawer (420) disposed in the third cavity (400), wherein a plastic shopping bag (440) can be affixed to the bag securing projection (430), used to collect refuse, discarded upon filling, then replaced by a second plastic shopping bag (440), wherein the portable bathroom cabinet system (100) comprising the first cavity (200), the second cavity (300), and the third cavity (400) and not comprising a fourth cavity, can be for used for providing storage proximal to a toilet for personal hygiene products, accessories, cleaning supplies, and refuse in a bathroom.

2. The system (100) of claim 1, wherein the cabinet system (100) is a single, integrated unit.

3. The system (100) of claim 1, wherein the cabinet system (100) is comprised of modular components that attach.

4. The system (100) of claim 1, wherein the cabinet system (100) comprises a plurality of legs (150) disposed beneath the cabinet system (100).

5. The system (100) of claim 1, wherein the cabinet system (100) comprises a plurality of wheels (160) disposed beneath the cabinet system (100).

6. The system (100) of claim 1, wherein the cabinet system (100) is constructed from a wood or an engineered wood product.

7. The system (100) of claim 1, wherein the cabinet system (100) is constructed from a plastic.

8. The system (100) of claim 1, wherein the cabinet system (100) is constructed from a metal.

9. The system (100) of claim 1, wherein the cabinet system (100) is constructed from a combination of wood, an engineered wood product, plastic or metal.

10. The system (100) of claim 1, wherein the first cavity (200) comprises an ultraviolet light assembly (218), for reducing bacteria, viruses, mold & dust mites in the first cavity (200).

11. The system (100) of claim 1, wherein the first cavity (200) comprises a lid (452).

12. The system (100) of claim 1, wherein the second cavity (300) comprises a lid (452).

13. The system (100) of claim 1, wherein the cabinet system (100) comprises a cabinet door (422) pivotally attached to the cabinet front face (140), said door (422) covers a side opening (424) on the cabinet front face (140), wherein said side opening (424) fluidly connects to the first cavity (200), the second cavity (300), or the third cavity (400).

14. The system (100) of claim 1, wherein the first cavity (200) further comprises a first cavity vent (216) disposed therein.

15. The system (100) of claim 1, wherein the third cavity (400) further comprises a third cavity vent (416) disposed therein.

* * * * *